US007418521B2

(12) United States Patent
Schroeder et al.

(10) Patent No.: US 7,418,521 B2
(45) Date of Patent: Aug. 26, 2008

(54) CONTROLLER FOR BRIDGING A HOST COMPUTER AND NETWORKED LAUNDRY MACHINES

(75) Inventors: Paul Donald Schroeder, Ripon, WI (US); William Joseph Quandt, Oshkosh, WI (US)

(73) Assignee: Alliance Laundry Systems LLC, Ripon, WI (US)

( * ) Notice: Subject to any disclaimer, the term of this patent is extended or adjusted under 35 U.S.C. 154(b) by 0 days.

(21) Appl. No.: 11/006,081

(22) Filed: Dec. 7, 2004

(65) Prior Publication Data

US 2006/0122715 A1 Jun. 8, 2006

(51) Int. Cl.
G06F 15/16 (2006.01)
G06F 15/173 (2006.01)
G06F 15/00 (2006.01)
G06F 13/36 (2006.01)
G05B 15/02 (2006.01)
G05B 19/18 (2006.01)
G05B 11/01 (2006.01)
G05B 11/32 (2006.01)
G05B 23/02 (2006.01)

(52) U.S. Cl. .................... 709/249; 709/208; 709/218; 709/224; 709/250; 700/9; 700/19; 700/65; 702/188; 710/306; 710/310; 340/3.1

(58) Field of Classification Search ........... 700/2–5, 700/9, 17, 19, 20, 65; 709/208, 212, 217, 709/218, 223, 224, 249, 250; 340/3.1, 3.9, 340/310.11, 5.61, 5.64; 341/176; 702/188; 710/305, 306, 310, 311
See application file for complete search history.

(56) References Cited

U.S. PATENT DOCUMENTS

| | | | | |
|---|---|---|---|---|
| 6,061,668 A * | 5/2000 | Sharrow | ...................... | 705/400 |
| 6,453,687 B2 * | 9/2002 | Sharood et al. | ............... | 62/127 |
| 6,507,590 B1 * | 1/2003 | Terho et al. | .................. | 370/466 |
| 6,665,384 B2 * | 12/2003 | Daum et al. | ........... | 379/102.03 |
| 6,690,979 B1 * | 2/2004 | Smith | .......................... | 700/65 |
| 6,778,868 B2 * | 8/2004 | Imamura et al. | .............. | 700/79 |
| 6,914,551 B2 * | 7/2005 | Vidal | .......................... | 341/176 |
| 6,944,584 B1 * | 9/2005 | Tenney et al. | ................. | 703/22 |
| 6,956,461 B2 * | 10/2005 | Yoon et al. | ............. | 340/310.11 |
| 2002/0007304 A1 * | 1/2002 | Kasajima et al. | .............. | 705/10 |
| 2002/0087351 A1 * | 7/2002 | Jo | ................................. | 705/1 |
| 2003/0182412 A1 * | 9/2003 | Lee et al. | .................... | 709/223 |

(Continued)

FOREIGN PATENT DOCUMENTS

JP    2002085888 A  *  3/2002
JP    2004164397 A  *  6/2004

*Primary Examiner*—Crystal Barnes Bullock
(74) *Attorney, Agent, or Firm*—Leydig, Voit & Mayer, Ltd.

(57) ABSTRACT

A laundry system has a plurality of laundry machines networked together and a remotely located host computer for collecting operation data and audit data from the laundry machines and to program the laundry machines with operation parameters. A bridging controller is provided to bridge the host computer with the network of laundry machines, and communicates with the host computer through a wired or wireless network connection. The host computer may command the bridging controller to collect data from the laundry machines and may send programming data to the laundry machines through the bridging controller.

26 Claims, 4 Drawing Sheets

U.S. PATENT DOCUMENTS

| | | | | |
|---|---|---|---|---|
| 2004/0015570 A1* | 1/2004 | Daum et al. | ............... | 709/220 |
| 2004/0039826 A1* | 2/2004 | Lee | ............... | 709/228 |
| 2004/0184431 A1* | 9/2004 | Park | ............... | 370/346 |
| 2004/0186965 A1* | 9/2004 | Yap et al. | ............... | 711/154 |
| 2004/0208117 A1* | 10/2004 | Kim | ............... | 370/216 |
| 2004/0267383 A1* | 12/2004 | Bicknell et al. | ............... | 700/65 |
| 2005/0108326 A1* | 5/2005 | Tuttle | ............... | 709/203 |
| 2005/0183209 A1* | 8/2005 | Costa et al. | ............... | 8/158 |
| 2007/0061406 A1* | 3/2007 | Baek et al. | ............... | 709/208 |

* cited by examiner

CONTROLLER FOR BRIDGING A HOST COMPUTER AND NETWORKED LAUNDRY MACHINES

FIELD OF THE INVENTION

This invention pertains generally to commercial laundry systems, and more particularly to a laundry system that comprises a plurality of networked laundry machines and a central host computer for programming the laundry machines and collecting status and audit data from the laundry machines.

BACKGROUND OF THE INVENTION

A commercial laundry system may have many laundry machines of various types, such as washers, extractors, dryers, and tumblers, etc. At any given time, the machines may be in different states of their operation cycles, and have various levels of usage. Monitoring the operations of the machines and auditing the usage and revenue collection of the machines can be an extremely time consuming and laborious task if it is to be performed by persons, and it is difficult to ensure that the information collected is sufficiently current. Moreover, the laundry machines may from time to time have to be reprogrammed with different operation parameters. Entering the parameters into each machine manually can be a very time consuming task that is prone to errors.

Computerized networking effectively solves these problems and enables a large number of laundry machines to be constantly monitored and audited, and reprogrammed when necessary, with minimal intervention from an operator. In one existing framework for networked commercial laundry systems, a plurality of laundry machines are connected together via a simple wired network, such as a RS-485 network. A host computer is also connected to the network of laundry machines to collect status and audit information from the laundry machines and to program the machines with selected operation parameters. To that end, each laundry machine has a microprocessor-based machine control circuit that is programmed to receive and transmit data packets through the network and to process commands received from the host computer. To communicate with the laundry machines over the network, the host computer, which may be a personal computer ("PC"), is equipped with a network interface card that handles the network communications over the network that connects the laundry machines together.

One problem with this existing framework for laundry systems is that the host computer has to be located in close proximity of the laundry machines, since it has to be connected to the wired network of the laundry machines. This often requires putting the host computer at the site of the laundry machines. This presents various potential problems, such as tampering, theft, and vandalism of the host computer. The restricted location of the host computer may also make it more difficult to retrieve data collected by the host computer and to service the computer in the field.

BRIEF SUMMARY OF THE INVENTION

In view of the foregoing, it is a primary object of the invention to provide a new framework/architecture to enable networked laundry machines to communicate with a host computer without requiring significant restrictions on the location of the host computer.

Based on the above primary object, it is an object of the invention to provide a networking framework for a laundry system that enables the laundry machines to communicate with a host computer that operates in its native networking environment such as the Ethernet.

It is a related object of the invention to provide a framework for the laundry system having networked laundry machines that avoids the need to install a PC card in the host computer in order to handle the communications with the laundry machines.

As an extension of the objects above, it is a further object of the invention to provide the needed hardware and software to implement the framework for the laundry system without the need to significantly modify the host computer.

These objects are achieved by the present invention as described in detail below.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
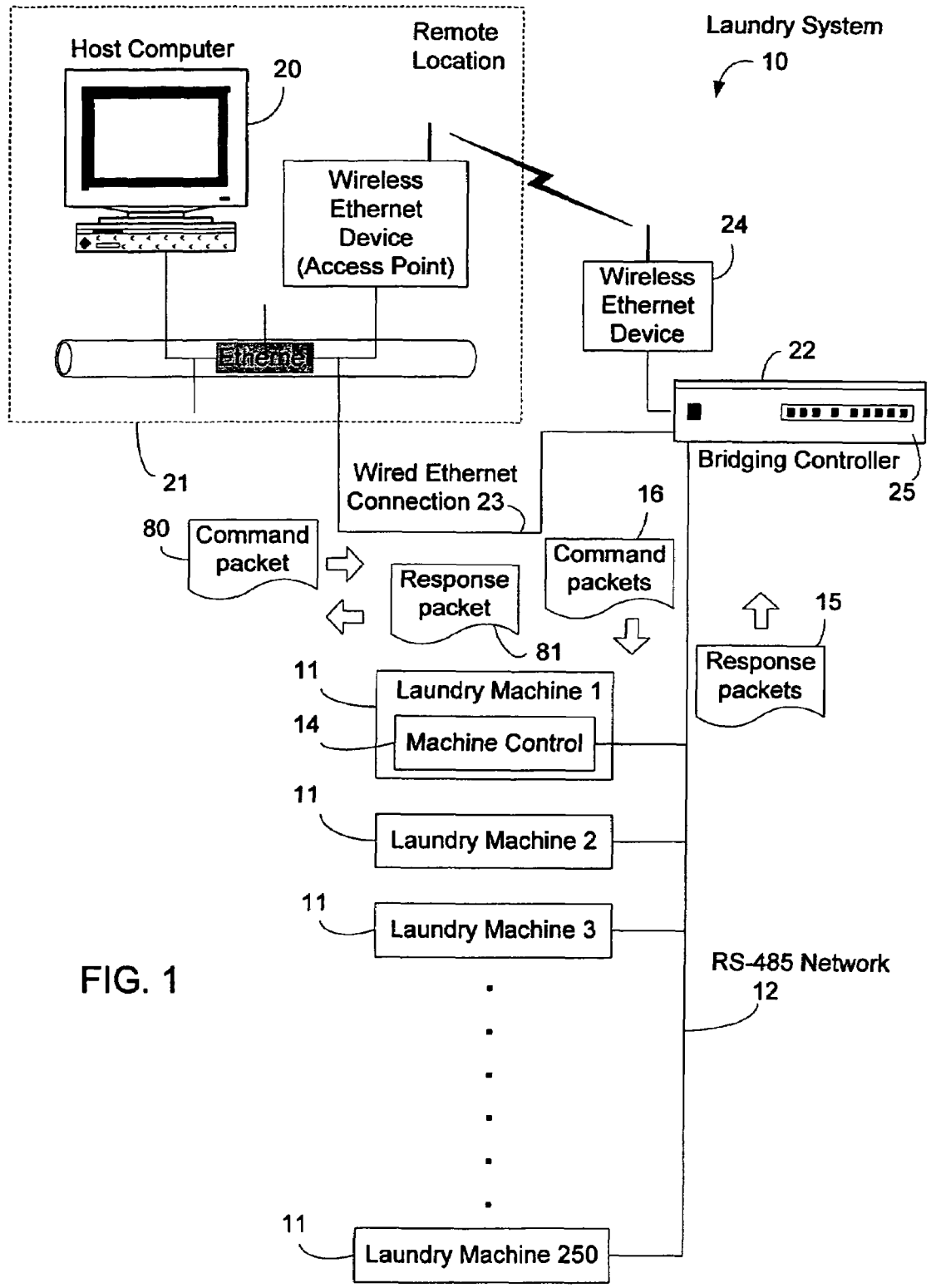
FIG. 1 is a schematic diagram showing a general structure of a laundry system in an embodiment of the invention that includes a bridging controller connecting a host computer and a network of laundry machines.

Turning now to the drawings, in which like numbers are used to refer to similar elements, FIG. 1 shows the general framework for a laundry system 10 in an embodiment of the invention. As illustrated in FIG. 1, the laundry system 10 includes a plurality of laundry machines 11 that are connected to form a communication network 12. In one embodiment, the network connection is formed according to the RS-485 standard, which is a TIA/EIA standard for serial multipoint communication lines and is especially suitable for connecting a large number of machines with relatively simple microprocessor-based controls for network communications. The network of laundry machines over the RS-485 network connections will sometimes be referred to in the following description as the RS-485 network. To handle the network communications, each laundry machine 11 has a microprocessor-based machine control circuit 14 that is capable of transmitting and receiving data packets over the RS-485 network 12 and processing received data, as described in greater detail below. In one embodiment, up to 250 laundry machines may be connected by the RS-485 network 12. The laundry machines 11 may be of various types that include, for example, top-load and front-load washers, extractors, dryers, tumblers, etc.

In accordance with an aspect of the invention, the networked laundry machines 11 communicate with a host computer 20 by transmitting and receiving communication packets 15, 16 over the RS-485 network. The communication packets may be formatted according to any suitable protocol. By sending and receiving data packets over the RS-485 network, each laundry machine 11 can communicate with the host computer 20. The machine control circuit 14 in each laundry machine also responds to commands from the host computer by transmitting the requested information or programming the laundry machine according to received program code or parameters.

The host computer 20 is preferably implemented in a personal computer (PC), which may have hardware and software for one or more common networking standards, such as the Ethernet. The host computer 20 is preferably at a location remote from the place where the laundry machines are located, although it can be located at the same site with the laundry machines. As used herein, "remote" means that the host computer is not at the same physical location (e.g., in the same room or on the same floor) with the laundry machines, and the separation between the host computer 20 and laundry machines 11 may be greater than allowed by the wiring protocol for forming the network 12. The host computer 20 is on its own network, such as the Ethernet network 21, that is separate from the RS-485 network 12 of the laundry machines.

In accordance with a feature of the invention, a bridging controller 22 is provided as an intermediary or liaison to bridge the host computer 20 and the network 12 of laundry machines together to allow communications to flow between the host computer and the networked laundry machines. To that end, in the illustrated embodiment, the bridging controller 22 is connected to the Ethernet 21 of the host computer 20 either via a wired Ethernet connection 23 or wirelessly through a wireless Ethernet device 24. On the other side, the bridging controller 22 is connected to the RS-485 network 12 of the laundry machines 11. The bridging controller 22 is preferably housed in its own protective housing 25, which may be similar to a set-top box, and has proper connectors for connections with the Ethernet 21 of the host computer and the RS-485 network 12 of the laundry machines 11.

The bridging controller 22 serves multiple functions. First, it provides the flexibility of placing the host computer 20 at a remote location, since the physical location of the host computer is no longer restricted by the wiring limitation according to the RS-485 standard. As a result, the host computer 20 can be placed at a remote location away from the floor of the laundry machines to provide enhanced security and protection as well as easy access by an authorized operator. Second, the bridging controller 22 converts communication packets 80 received through the Ethernet 21 from the host computer into one or more control packets 16 constructed according to the communication protocol implemented in the networked laundry machines, and converts data in response packets 15 from the laundry machines into one or more response messages 81 for transmission to the host computer. In this way, the bridging controller 22 relays commands and programming data from the host computer 20 to the laundry machines 11, and relays status data and audit data from the laundry machines 11 to the host computer 20. This eliminates the need for the host computer 20 to communicate directly with the laundry machines 11 over the RS-485 network 12, and the host computer only has to be able to operate in its native networking environment, such as the Ethernet 21. Third, the bridging controller 22 may be programmed to automatically collect data from the machine controls 14 of the laundry machines 11. This alleviates the burden on the host computer 20 to manage the data collection from the laundry machines 11. In connection with the data collection, the bridging controller 22 also provides a buffer memory for storing information collected from the laundry machines 11, thus making the information readily available when the host computer asks for the information.

Figure 2:
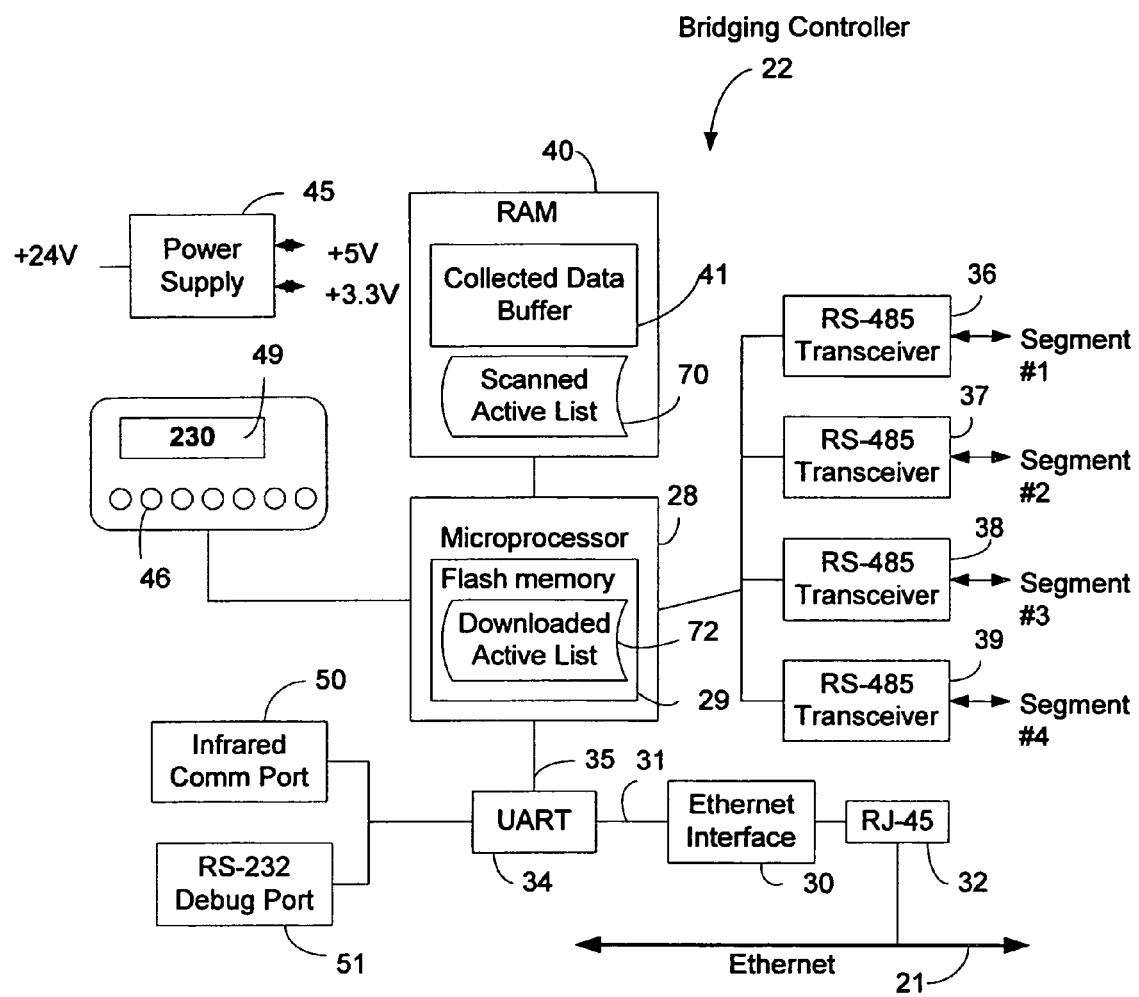
FIG. 2 is a schematic diagram showing components of a bridging controller used in the laundry system of FIG. 1.

Turning now to FIG. 2, to carry out the functions just mentioned above, the bridging controller 22 has a microprocessor-based control circuit. In one embodiment, the microprocessor 28 is an 8051-compatible microcontroller. The 8051 microcontroller is originally developed by Intel Corporation in the 1980s and has become an industry standard. A suitable 8051-compatible microcontroller for use in the bridging controller is, for example, a microcontroller of model number AT89C51ED2 from Atmel Corporation in San Jose, Calif. This microcontroller contains 64K bytes of flash-based program memory 29 and other features, such as EEPROM memory, watchdog timer, full duplex UART (Universal Asymmetric Receiver Transmitter), and 64 pins of discrete I/O bits, etc.

To connect the microcontroller 28 to the Ethernet local area network (LAN) 21 of the host computer, the bridging controller 22 includes an Ethernet interface component 30. The Ethernet interface 30 provides the functionality necessary to interface with a 10/100 Base-T Ethernet. In one implementation, the Ethernet interface 30 used is a product called XPort from Lantronix, Inc. in Irvine, Calif. The Ethernet interface 30 is connected to the Ethernet 21 of the host computer through a RJ-45 connector 32. Alternatively, the Ethernet interface 30 may be connected to a wireless network adaptor 24 with a wireless transceiver for wireless communications with the host computer 20 over the Ethernet as illustrated in FIG. 1. Data transfer between the Ethernet interface 30 and the microcontroller 28 is through a UART module 34. The UART module 34 is connected to the microcontroller via a SPI (Service Provider Interface) data bus 35, and is connected to the Ethernet interface 30 via the data bus 31.

To allow the bridging controller 22 to communicate with the laundry machines 11, the microcontroller 28 is further connected to the RS-485 network 12 of the laundry machines. In one embodiment, the microcontroller 28 is optionally connectable to four segments of the RS-485 network 12. This is accomplished by multiplexing the transmit and receive data lines of the internal UART of the 8051-compatible microcontroller 28. Two I/O bits from the microcontroller 28 are used to control the switch. Four RS-485 transceivers 36-39 are provided for the connecting the microcontroller 28 to the four segments of the RS-485 network 12 respectively. When the bridging controller 22 scans the RS-485 network 12 for valid addresses of active laundry machines on the network, the current segment number will be stored in the non-volatile memory 29 of the microcontroller along with the network address of each laundry machine.

For storing information collected from the laundry machines 11 on the RS-485 network 12, the bridging controller 22 further includes a random-access memory (RAM) 40. In one implementation, the RAM 40 has a size of 2 megabyte. A portion of this memory, such as 500K bytes, is used as a buffer 41 for storing information collected from the machine controls 14 of the laundry machines 11 on the RS-485 network. Each laundry machine 11 is allocated with 2 Kbytes of that 500K bytes of memory space in the buffer 41. Also contained in the RAM 40 is a bank of control status information that may be passed to the host computer 20.

To provide electrical power for the operation, the bridging controller 22 includes a power supply 45, which converts an input voltage in the range of +24VDC to two voltages of +5VDC and +3.3VDC. The bridging controller 22 further includes display means, such as light-emitting diodes (LED's) 46 and a small display device 49. The LED's 46 are for indicating the status of the bridging controller 22. One LED indicates whether there is power to the controller. Another LED indicates the "heart beat" of the controller and is toggled on/off every second. A bi-color LED indicates whether there is an active Ethernet connection. There is also one bi-color LED for each of the four RS-485 ports for indicating the status of the associated network segment. This LED is off if there is no known nodes (i.e., machine controls) on the network segment. If the LED is green, it indicates that all known nodes on that segment are communicating successfully to the controller. If the LED is red, then one or more of the nodes are not communicating. The display device 49 includes three 0.5" 7-segment green LED elements and is used for displaying the address (e.g., No. 230) of the laundry machine currently communicating with the bridging controller. The bridging controller 22 may include further components, such as an infrared communication port 50 and an RS-232 port 51. The RS-232 link can be used for debugging purposes and for programming application code into the flash memory of the microcontroller 28, etc.

Figure 3:
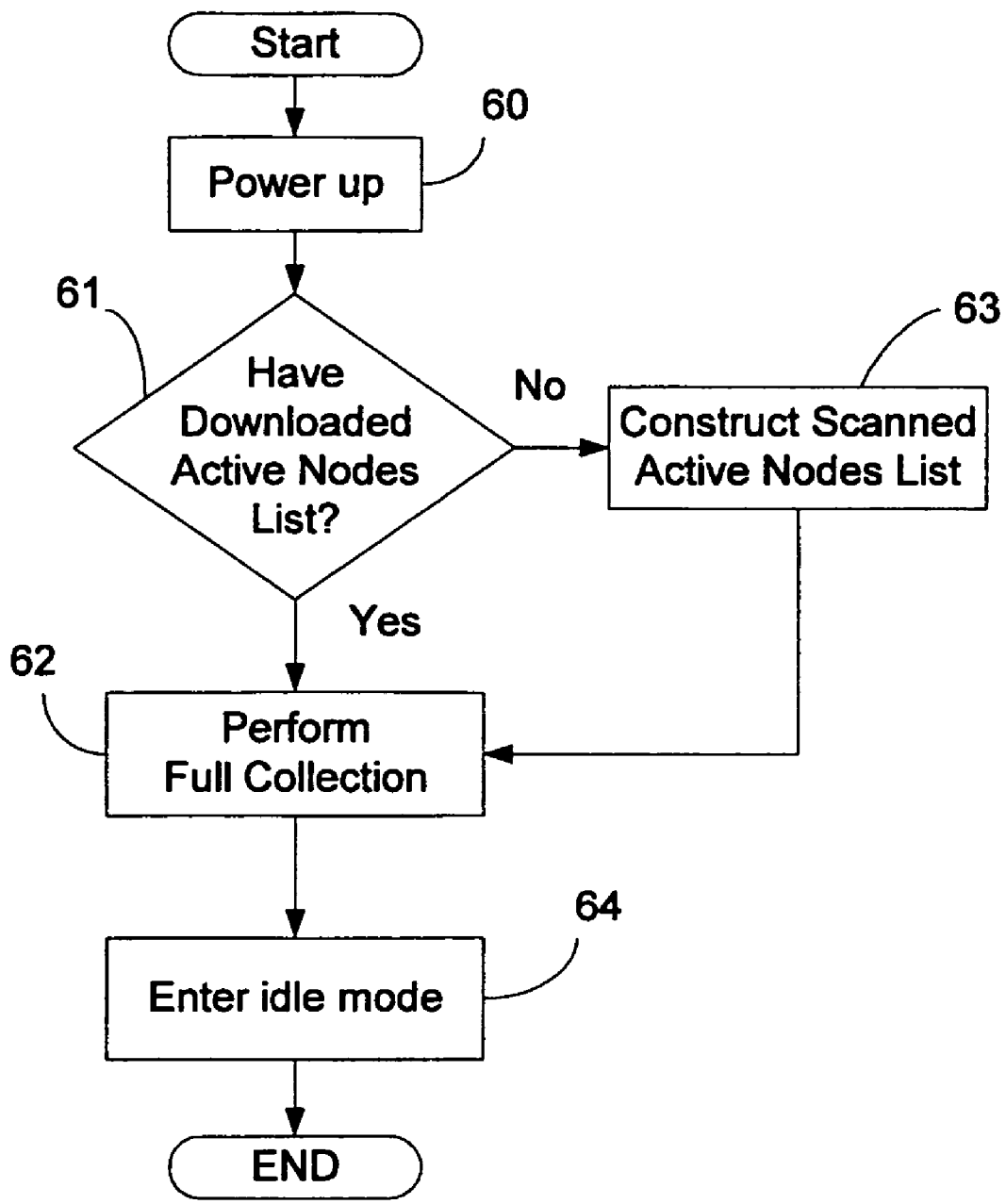
FIG. 3 is a flow chart shows steps performed by the bridging controller after being powered up.

In one embodiment, the bridging controller 22 is programmed to automatically collect data from the laundry machines 11 and also to collect data upon receiving a request from the host computer 20. Referring to FIG. 3, after it is powered up for a preset time (e.g., 15 seconds) (step 60), the bridging controller 22 begins communications with the machines controls 14 of the laundry machines 11 on the RS-485 network 12. If the controller 22 has a Downloaded Active Nodes List in its non-volatile (flash) memory (step 61), it performs a full collection operation to gather data from the laundry machines (step 62). If it does not have a Downloaded Active Node List, the bridging controller 22 performs the operation of constructing a Scanned Active Nodes List (step 63), and then performs a full collection operation based on that constructed list. The bridging controller performs the full collection operation upon power up so that it will have current machine data available in its collection buffer 41 in the RAM 40 for responding to a data collection request from the host computer 20.

After the full collection operation is done, the bridging controller 22 enters an idle mode (Step 64), in which it waits for a command from the host computer 20. The data collected and stored in the buffer in the RAM 40 is to be uploaded to the host computer 20 upon receiving a request from the host computer. In the idle mode, the bridging controller 22 still communicates with the machine controls 14 on the RS-485 network periodically to check the communication link with the machines, and to maintain current machine control data. There are two types of communications for data collection between the bridging controller 22 and the machine controls on the RS-485 network in the idle mode. The first one includes communications for a machine status collection operation, which collects mainly machine status data representing a snap shot of the machine status from the machine controls. To perform a machine status collection, the bridging controller 22 sends a MACHINE_STATUS_COLLECT command to the machine control, and the machine control responses by sending one or more packets containing the machine status data and limited audit information. The bridging controller 22 may be programmed to perform the machine status collection at a pre-selected time interval, which may vary between, for example, 0 and 255 minutes. A value of 0 for the pre-selected time interval means that the bridging controller 22 is to begin the next machine status collection sequence as soon as it finishes the current one. The machine status collection is done so that the machines available/unavailable status, time remaining in a cycle status, new program data status, any error conditions, and limited audit data can be reported through the bridging controller to the host computer as soon as possible.

The second type of communications for data collection in the idle mode includes communications for a full collection operation, which collects all the audit, programming, and time/date data available from an individual machine control. To perform a full collection, the bridging controller 22 sends a FULL_COLLECT command to an individual machine control 14 on the RS-485 network 12, and the machine control responds by sending its full set of data to the bridging controller 22. As mentioned above, the bridging controller 22 maintains 2K bytes of buffer memory space for the data collected from each machine control. The data from a full collection from a given machine control 14 is stored in the buffer memory 41 separately from the data from a machine status collection from the same machine control. Each time a full collection or machine status collection is performed from a node on the RS-485 network 12, the corresponding data in the buffer memory space for that node will be overwritten with the new data received. The bridging controller 22 may be programmed to perform the full collection operation after every N times of machine status collection operations, where N is an integer selected from, for example, the range of 0 to 255.

The polling done by the bridging controller 22 on the machine controls 14 may be interrupted by commands from the host computer 20. The commands may include data collection, programming, and diagnostic commands. In the event of receiving a command from the host computer, the bridging controller 22 suspends the polling, performs the required task, and then resumes the polling from where it leaves it off.

Returning to FIG. 2, to ensure proper collection of information from the laundry machines 11 on the RS-485 network 12, the bridging controller 22 maintains lists of active nodes (i.e., machine controls) on the network. There are two types of active nodes lists. The first one is a Scanned Active Nodes List 70, which the bridging controller 22 stores in its RAM 40. As a result, this list will be lost if power if removed from the bridging controller 22. The Scanned Active Nodes List 70 is constructed by the bridging controller 22 after it is powered up if the non-volatile (flash) memory 29 of the microcontroller 28 does not contain a Downloaded Active Node List 72. To construct the Scanned Active Nodes List, the bridging controller 22 performs three rounds of "pings." On the first round, the bridging controller 22 pings all the up to 250 nodes. In each of the following two rounds, it skips from the ping list all the nodes that have already been found in the previous round or rounds. The nodes found in the three rounds of pings are listed in the Scanned Active Nodes List 70. Once this list is built, the bridging controller 22 performs a full collection operation on each of the nodes in the list. The Scanned Active Nodes List is used by the bridging controller 22 as its main listing of active nodes in the RS-485 network until a Downloaded Active Nodes List is received from the host computer.

The Downloaded Active Nodes List 72 is to be stored in the non-volatile (flash) memory 29 of the microcontroller 28 of the bridging controller 22 so that it will not be lost when there is a power failure. The Downloaded Active Nodes List 72 is constructed in two parts. First, a node list is received from the host computer. This node list indicates only that a given node is active or inactive. When this list is received from the host computer, the bridging controller 22 should, where possible, extract from the Scanned Active Nodes List the segment number for each node in the list, and import that information into the list it received from the host computer to form the Downloaded Active Nodes List. The Downloaded Active Nodes List then becomes that main listing used by the bridging controller 22 to control polling of the nodes on the RS-485 network. Through the bridging controller 22, the host computer 20 is able to talk to a specific individual laundry machine 11 on the RS-485 network 12, or talk to all the machines in a broadcast mode. By means of the communications with the laundry machines 11 through the bridging controller 22, the host computer 20 can perform various tasks such as programming an individual machine, collect audit data from each of the machines, and perform diagnostic tests on the machines.

Figure 4:
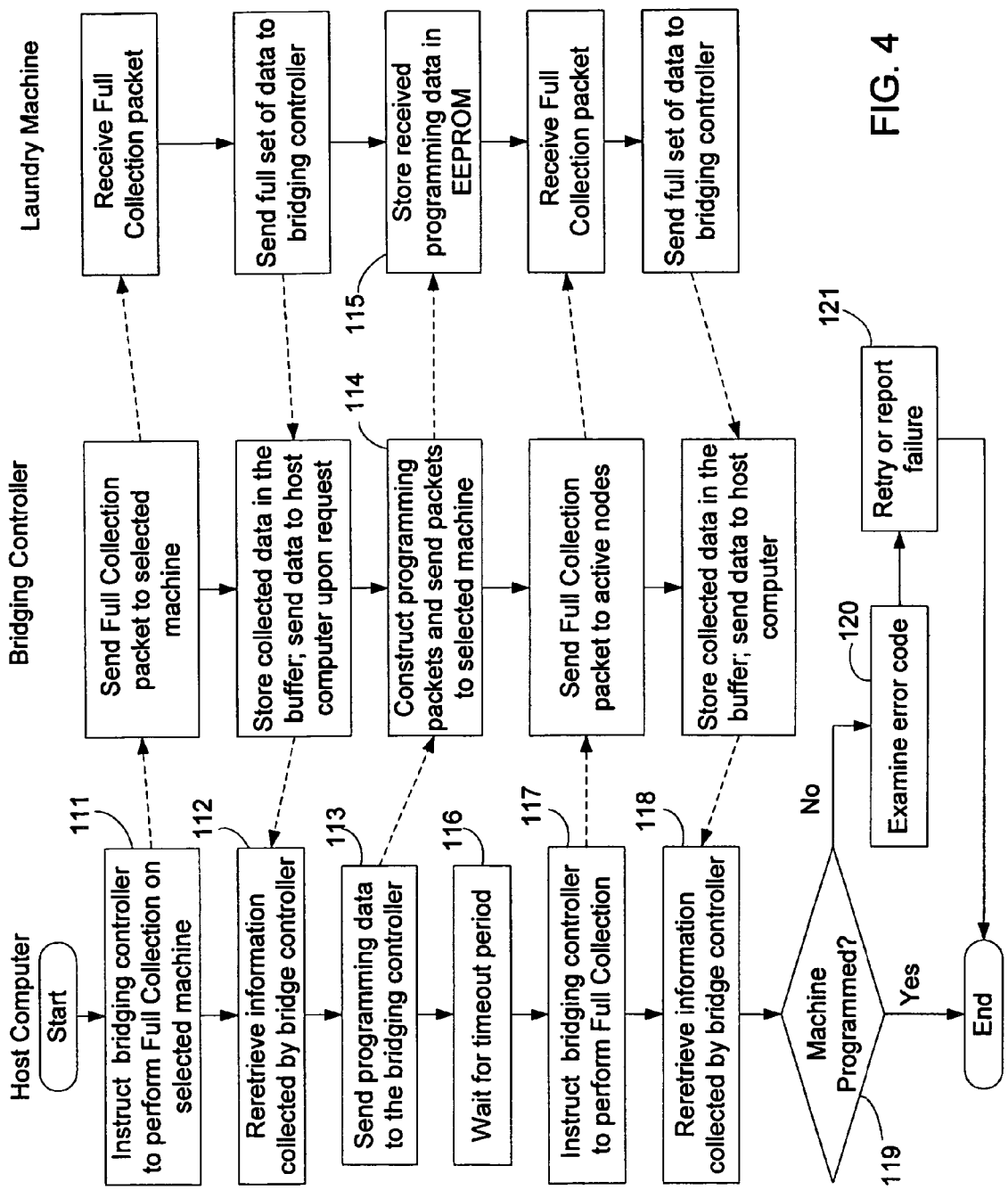
FIG. 4 is a flow chart showing an operation of programming a laundry machine by the host computer.

By way of example, the following description describes how the host computer 20 utilizes the bridging controller 22 to perform the task of programming the machine control 14 of a laundry machine 11 on the RS-485 network 12. Referring now to FIG. 4, before the host computer 20 performs a programming sequence on a machine control 14 of a laundry machine 11 on the RS-485 network 12, it is required to first instruct the bridging controller 22 to perform a full collection operation to collect data from all the nodes in the active nodes list of the bridging controller 22 (step 111). The host computer then retrieves from the bridging controller 22 the information collected from all the nodes it intends to program (step 112). This is done so that the host computer 20 has the latest audit information from a given laundry machine before changing the programming information on that machine.

Once the host computer 20 receives the current data collected by the bridging controller 22 from the machine control 14, it sends the programming data in a programming command packet to the bridging controller 22 via the Ethernet connection (step 113). When the bridging controller 22 receives the programming command, it generates control packets that carry the programming data received from the host computer, and initiates a communication sequence with the node specified by the host computer to send the control packets to that node (step 114). The programming sequence is carried out by means of communication packets to and from the node over the RS-485 network. Once this communication sequence is complete, the machine control 14 of the laundry machine being programmed writes the new programming data it just received into its EEPROM (step 115).

To ensure that the programming information it sent to the bridging controller 22 has actually being implemented in the designated machine control 14, the host computer 20 instructs the bridging controller 22 to perform another full collection operation on all the active nodes in the RS-485 network (step 117). The instruction is sent after allowing sufficient time for the entire programming sequence to be completed in a normal course (step 116). The host computer 20 then retrieves the information collected by the bridging controller 22 in the full collection operation from the nodes that are re-programmed (step 118). The host computer 20 examines the Total Number of Network Downloads Counter for each of those nodes, and compares that number with the value for the same variable received during the full collection operation prior to the programming (step 119). If the value has not been incremented by one, the programming sequence was not successful for that node. In that case, the host computer 20 examines the error code retrieved from the node that resulted from the failed programming attempt (step 120). Based on the values of the error code, the host computer may decide whether to retry the programming sequence or report a programming failure to the user (step 121).

It will be appreciated that a new framework for a networked laundry system utilizing a bridging controller to facilitate communications between a host computer and networked laundry machines has been disclosed herein. In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A controller for bridging a host computer and a plurality of networked laundry machines, comprising:
   a microprocessor;
   a memory;
   means for communicating over a first network on which the host computer resides; and
   means for communicating over a second network on which the laundry machines reside, the microprocessor being programmed to receive a control command for a first laundry machine from the host computer over the first network, and communicate with the first laundry machine over the second network to carry out the control command, wherein the control command is configured to perform an action including one or more of collecting data from the first laundry machine, programming the first laundry machine, and providing operation parameters for the first laundry machine, the microprocessor being further programmed to receive at least one response containing response data from the first laundry machine over the second network, and transmit the response data to the host computer over the first network.

2. A controller as in claim 1, wherein the first network is an Ethernet network.

3. A controller as in claim 2, wherein the means for communicating over the first network includes an Ethernet interface.

4. A controller as in claim 1, wherein the means for communicating over the first network includes a wireless transceiver for wireless communications with the host computer over the first network.

5. A controller as in claim 1, wherein the second network connects the laundry machines via network connections according to the RS-485 standard, and wherein the means for communicating over the second network includes at least one RS-485 transceiver.

6. A controller as in claim 1, wherein the microprocessor is further programmed to store the response data into a buffer.

7. A controller as in claim 1, wherein the microprocessor is further programmed to periodically send a data collection command to a selected laundry machine on the second network to collect data from the selected laundry machine.

8. A controller as in claim 7, wherein the data collection command is for collecting a full set of data from the selected laundry machine.

9. A controller as in claim 7, wherein the data collection command is for collecting a partial set of data from the selected laundry machine.

10. A controller as in claim 7, wherein the microprocessor is programmed to store the collected data from the selected laundry machine into a buffer.

11. A controller as in claim 1, wherein the microprocessor is further programmed to compile a list of active laundry machines on the second network.

12. A method for controller connecting a host computer on a first network and a plurality of laundry machines on a second network to control operations of the laundry machines, the host computer being remotely located from the laundry machines, the method comprising:

receiving a control command from the host computer via the first network for a first laundry machine on the second network, wherein the control command is configured to perform an action including one or more of collecting data from the first laundry machine, programming the first laundry machine, and providing operation parameters for the first laundry machine;

communicating with the first laundry machine over the second network to carry out the control command;

receiving a response containing response data from the first laundry machine on the second network; and transmitting the response data to the remotely located host computer via the first network.

13. A method as in claim 12, wherein the first network is an Ethernet network.

14. A method as in claim 12, wherein the controller is connected to the first network via a wireless connection, and wherein the steps of receiving the control command and transmitting the response data include receiving and sending wireless transmissions over the first network.

15. A method as in claim 12, further including the step of storing the response data from the first laundry machine into a buffer, and wherein the step of transmitting the response data includes retrieving the response data from the buffer in response to a request from the host computer.

16. A method as in claim 12, further including the step of periodically sending a data collection command to a selected laundry machine on the second network to collect data from the selected laundry machine.

17. A method as in claim 16, wherein the data collection command is for collecting all data available from the selected laundry machine.

18. A method as in claim 16, wherein the data collection command is for collecting a subset of all data available from the selected laundry machine.

19. A method as in claim 12, further including the step of compiling a list of active laundry machines on the second network.

20. A laundry system comprising:
a host computer residing on a first network;
a plurality of networked laundry machines residing on a second network, the host computer being remotely located from the laundry machines; and
a controller for bridging the host computer and the networked laundry machines, the controller having a microprocessor, a memory, means for communicating over the first network, and means for communicating over the second network, the microprocessor of the controller being programmed to receive from the host computer over the first network a control command for a first laundry machine on the second network, and communicate with the first laundry machine to carry out the control command, wherein the control command is configured to perform an action including one or more of collecting data from the first laundry machine, programming the first laundry machine, and providing operation parameters for the first laundry machine, the microprocessor being further programmed to receive a response containing response data from the first laundry machine over the second network, and transmit the response data to the remotely located host computer over the first network.

21. A laundry system as in claim 20, wherein the first network is an Ethernet network.

22. A laundry system as in claim 20, wherein the means for communicating over the first network includes a wireless transceiver for wireless communications with the host computer over the first network.

23. A laundry system as in claim 20, wherein the second network connects the laundry machines via network connections according to the RS-485 standard, and wherein the means for communicating over the second network includes at least one RS-485 transceiver.

24. A laundry system as in claim 20, wherein the microprocessor of the controller is further programmed to store the response data into a buffer.

25. A laundry system as in claim 20, wherein the microprocessor of the controller is further programmed to periodically send a data collection command to a selected laundry machine on the second network to collect data from the selected laundry machine.

26. A laundry system as in claim 20, wherein the microprocessor of the controller is further programmed to compile a list of active laundry machines on the second network.

* * * * *